July 15, 1958  W. H. EDMUNDS  2,843,702
PROTECTIVE DEVICE WITH CURRENT LIMITING MEANS
Filed Oct. 22, 1952  2 Sheets-Sheet 1
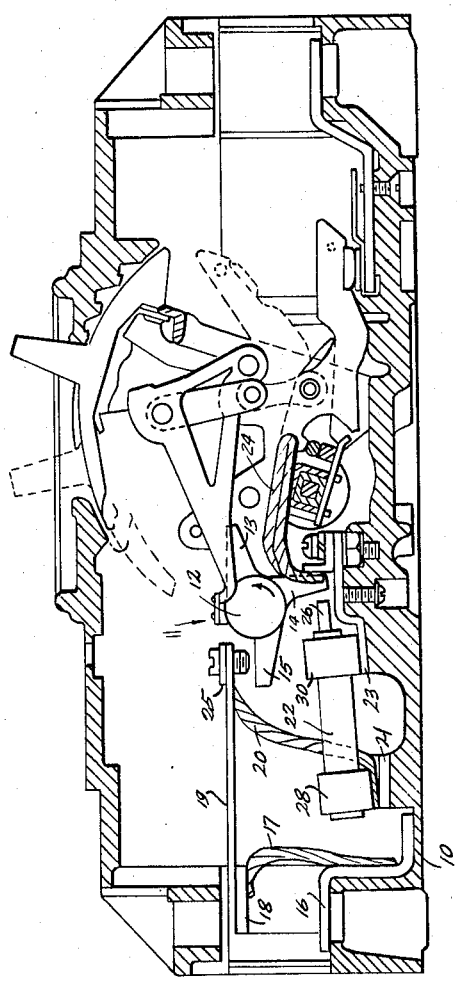
INVENTOR.
WILLIAM HAROLD EDMUNDS
BY
Ostrolenk + Faber
ATTORNEYS July 15, 1958 W. H. EDMUNDS 2,843,702
PROTECTIVE DEVICE WITH CURRENT LIMITING MEANS
Filed Oct. 22, 1952 2 Sheets-Sheet 2
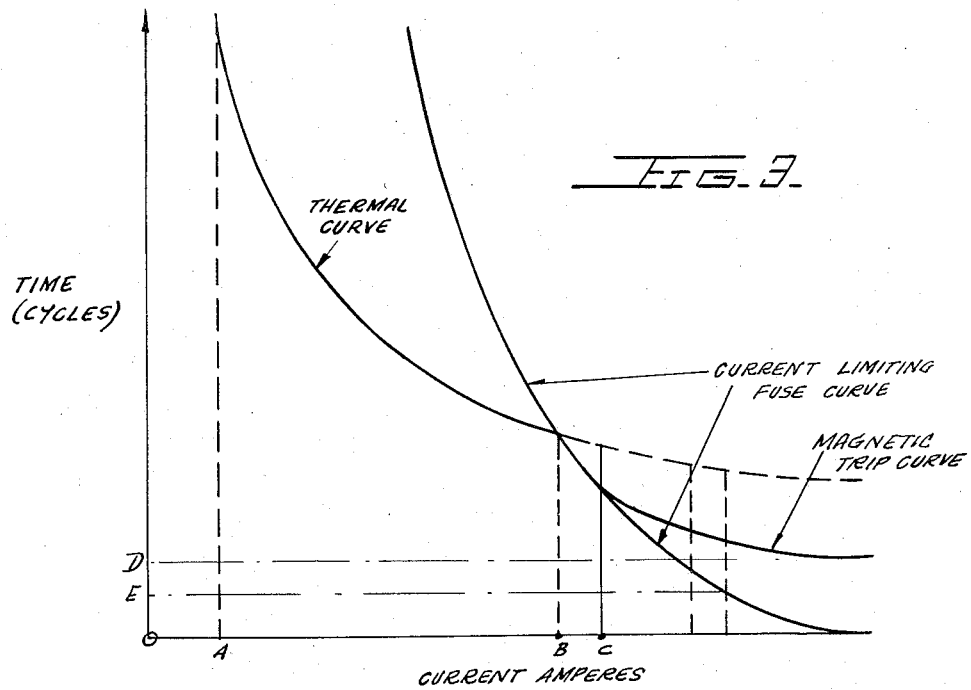
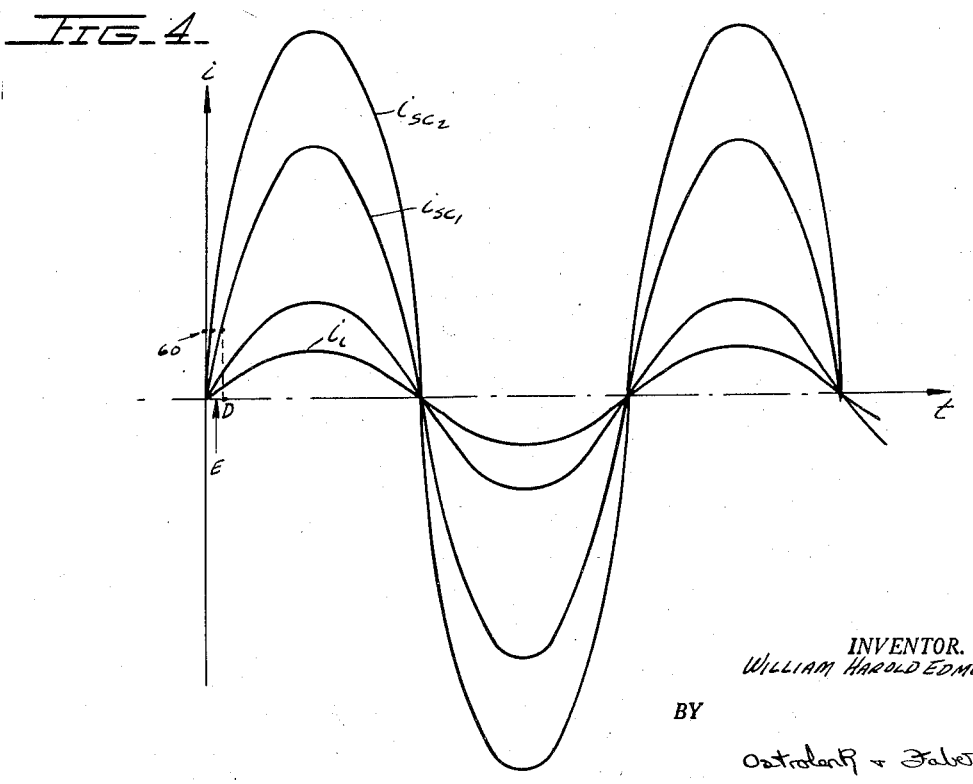
INVENTOR.
WILLIAM HAROLD EDMUNDS
BY
Ostrolenk + Faber
ATTORNEYS

United States Patent Office 2,843,702
Patented July 15, 1958

2,843,702

PROTECTIVE DEVICE WITH CURRENT LIMITING MEANS

William Harold Edmunds, Havertown, Pa., assignor to I-T-E Circuit Breaker Company, Philadelphia, Pa.

Application October 22, 1952, Serial No. 316,221

12 Claims. (Cl. 200—114)

My present invention relates to overcurrent protective devices and more particularly, it relates to protective devices for automatically disconnecting a load from the multi-phases of the line when the current amplitude in any one phase reaches a value higher than a predetermined maximum safe value.

My invention is particularly adapted for circuit protective equipment where it is necessary and desirable to have an instantaneous opening on the occurrence of a high fault current which is in the range of 0.1 to 0.2 cycle per second or .00017 second to .00034 second for speed of operation.

Some type of circuit breakers are constructed with both thermal and magnetic trip. The former thermal trip means provides an inverse time element for the device so that the time of opening is inversely proportional to the magnitude of fault current. However, on the occurrence of severe short circuit currents, it is frequently necessary and desirable to prevent the current from reaching its short circuit peak value by having the circuit interrupted within a small portion of the cycle of fault current occurrence. However, the magnetic instantaneous trip circuit breakers have been found to delay the actual contact separation for as long as two or three cycles or from .033 second to .05 second.

The reason this undesirable result occurs is due to the static inertia of the relay and the circuit breakers cradle link mechanism and contact arms. That is, appreciable time elapse occurs between the moment when the opening operation is initiated and the moment when the circuit breaker contacts actually interrupt the circuit due to the relatively slow operation of the mechanical linkage between the magnetic trip unit and cooperating contacts.

Hence, with this prior art arrangement, the full magnitude of the short circuit current is permitted to flow through the load for several cycles with possible resulting damage thereto. Furthermore, contact separation may occur under the peak value of the short circuit thereby putting an undue interrupting capacity duty on the contacts. With the structural arrangement of my invention, it is possible to provide current limiting means so that the circuit is interrupted within .2 cycle per second to thereby prevent the full magnitude of short circuit current from flowing in the circuit and furthermore, permits the circuit breaker to subsequently open the circuit with substantially reduced interrupting capacity duty.

It is well known in the art that some type of fuses, for example the "current limiting" type are capable of interrupting very high short circuit values. Also, current limiting fuses have an inverse time characteristic such that at very high currents, their speed of operation is in the range of 0.1 to 0.2 cycle per second.

However, current limiting fuses present two major shortcomings: (1) on multi-phase systems, the blowing of one fuse may cause single phasing and, therefore, the burning out of the equipment protected; (2) there must be a disconnecting means ahead of them. That is, on a fault in a polyphase system, it is probable that not more than one of the current limiting fuses will blow. Thus, on a three-phase system, this will leave the load energized under single phase voltage conditions which is a dangerous condition for rotating machinery.

The rotating machinery load will be subject to injury since it will try to carry the same load as it did before on the three-phases, but now on a single phase the current must necessarily be very much higher and thus there is danger of burn out. However, not only is the rotating machinery in danger of destruction but also the supply transformer which now tries to furnish single-phase energy in an amount equal to the total three-phase energy it previously supplied. Thus, it is possible to burn out the three phase transformer running under single phase condition.

With regard to the second above mentioned disadvantage, after the current limiting fuse blows, it becomes necessary to renew the fuse in order to restore the service. To do this properly necessitates isolating the circuit which requires some sort of device which is capable of doing the isolation without endangering personnel or property. Hence, it is necessary to back up the fuse with additional disconnect means which further adds to the expense of using a current limiting fuse as sole protective equipment.

With the structural arrangement of my invention, these disadvantages resulting from the sole use of current limiting fuses as protective devices, namely single phasing and means for isolating the circuit, are overcome.

My present invention overcomes the difficulties described above by providing multipole circuit breaker with a current limiting fuse in series with each pole. Each current limiting fuse has means which make possible the tripping of all poles of the multi-phase system, when the fuse blows, thus eliminating dangerous single phasing.

My invention provides a structural arrangement whereby a plunger actuated by the current limiting fuse, engages a common tripper bar of the circuit breaker to trip all the pole on the occurrence of a fault current in one phase. This means not only prevents the possibility of single phasing but permits the contacts to separate after the fuse has interrupted the circuit and thereby removes interrupting capacity duty from the contacts. That is, the contacts can now separate under either no load or normal load conditions without having to interrupt short circuit current values.

As an additional protective device for low overcurrents, thermally responsive means can be used in series with the fuse to trip open all poles of the multi-phase system. Thus, the inverse time delay action is desired and it can be obtained from the thermal element in substantially the same manner as provided in prior art circuit breakers. However, the tripping function of the prior art magnetic trip is performed by the current limiting fuse in the apparatus of my invention. It will be noted that the magnetic trip means may be retained in the circuit breaker if it is desirable to have trip-free operation.

Essentially, my current limiting device consists of a fuse which performs two functions, (1) it melts at high short circuit currents to thereby limit and interrupt the current flow in its phase, and (2) after melting, it releases a plunger compressed by a spring, which operates the common trip bar of multi-pole circuit breakers, thus simultaneously opening each pole of the circuit breaker in the multi-phase system with the result that single phasing is avoided. The plunger's position will also indicate which fuse of the multi-phase system has blown.

In this position, the plunger striker pin, as a result of its spring bias, will preclude the reclosing of the circuit breaker until the ruptured current limiting fuse is replaced.

The main object of my present invention is, therefore, a current limiting device for multi-phase systems in which the fusible element not only interrupts the circuit in which it is electrically connected but also simultaneously opens the other phases of multi-phase system.

Another object of my present invention is the provision of means whereby a plunger is released by a current limiting fuse when the fusible link of the fuse ruptures to thereby simultaneously open all interrupting devices of a multi-phase system.

A further object of my present invention is the provision of means for tripping open simultaneously the interrupting devices of a multi-phase system at values of currents below those at which fuse means will operate.

More specifically, another object of my present invention is a thermal element responsive to fault currents of values lower than those at which a fuse will operate and capable of tripping open simultaneously the interrupting devices of a multi-phase system.

Another object of my invention is to provide a circuit breaker in which the position of the plunger will be indicative of the phase which is at fault.

A still further object of my invention is to provide circuit protective means which will interrupt short circuit currents within one cycle.

Another object of my invention is to provide circuit protective means with cooperating contacts which have a relatively low interrupting capacity duty irrespective of the magnitude of short circuit current.

A still further object of my invention is to provide a novel arrangement utilizing current limiting fuses for a multi-phase system and eliminating the possibility of single phasing.

A further object of my invention is to provide circuit protective equipment which can interrupt short circuit currents with a fraction of one half cycle irrespective of the time lag introduced by the mechanical linkage of the circuit breaker.

With the above and other objects and features in view, the invention will now be described with reference to the accompanying drawings, in which:

Figure 1 is a schematic side view of one pole of a multi-pole circuit breaker incorporating the current limiting device.

Figure 2 is a side sectional view of the current limiting device used with my invention.

Figure 3 is a time curve showing operative response of the current limiting fuse, magnetic and thermal units, and illustrates their inverse time characteristics.

Figure 4 is a time current curve showing the points of rupture for the current limiting device.

Referring to Figure 1, I show a current limiting device and a thermal unit for one pole of a multi-pole circuit breaker. A plastic base 10 houses the control and contact means for each phase of the power line. This circuit breaker may be of the type disclosed in my Patent No. 2,574,093, issued November 6, 1951, with the cross-sectional view of Figure 1 illustrating the electrical and mechanical components for one pole of the circuit breaker. The current limiting device used in connection with the circuit breaker may be of the type set forth in Patents Nos. 2,321,711; 2,342,310; 2,358,676 and 2,592,399.

The common tripper bar 11, as is well known in the art, forms a portion of the latch mechanism (not shown) which is instrumental in maintaining the contacts closed. When the common tripper bar 11 is rotated in a counter-clockwise direction, as shown by the arrow, the latch is released and spring means are provided to separate the contacts located in each phase of the power line. The common tripper bar 11 pivots about the point 12 and is provided with three main extensions 13, 14 and 15.

As will hereinafter be more fully explained, extension 15 will be engaged by the thermal means 19—25 when an overcurrent exists to trip the circuit breaker open. In the event of a severe fault current such as a short circuit, the current limiting device 22 will be instrumental in engaging the extension 14 and thus rotating the tripper bar 12 counterclockwise to effect contact disengagement.

Thus, as will hereinafter be apparent, the first mentioned extension 15 will cause rotation of the tripper bar 11 for small values of overcurrent and the second extension 14 will cause rotation of the tripper bar 11 for severe or short circuit values of current.

The flow of current through one phase of the power lines may be traced as follows: through load terminal 16, pigtail 17, base 18, thermal element 19, pigtail 20, base 21, current limiting device 22, lug 23, mechanism lead 24 and thence through the main contacts.

One end of thermal element 19 is rigidly attached to the base 18 and is constructed so that the metal with the high coefficiency of expansion is located on the top surface of the pancaked metals. Hence, the bimetal 19 is cantilevered about base 18 at one end and the other end thereof has a calibration screw 25 attached thereto. Hence, if thermal unit 19 is sufficiently heated, it will be deflected downwardly, thereby bringing the calibration screw 25 into engagement with the extension 15 of the tripper bar 11.

It will be noted that this construction and operation of the overcurrent device 19 is old and well known in the art. However, it is frequently necessary and essential that thermal circuit breakers of this type have an additional current responsive means which has a faster time response than thermostatic metal 19. That is, when severe or short circuit currents occur, it is essential that there be instantaneous opening of the circuit breaker with no time lag.

The essence of my invention is to provide a current limiting device, to achieve this instantaneous separation of the contacts on the occurrence of a severe fault current.

As above noted, the current limiting device 22 is located in series with the main electrical circuit. As will hereinafter be explained, when a fault current occurs, the fusible element 29 of the current limiting device 22 is ruptured and a spring mechanism is released to drive the plunger 26 forward. The plunger 26 will engage the extension 14, as above noted, thereby rocking the common tripper bar 11 clockwise and thus open the circuit breaker.

A cross-sectional detailed side view of the current limiting device 22 is shown in Figure 2. A hollow cylindrical housing 27 serves as a main insulating casing for the unit. A metal cap 28 is provided to fit over one end of the hollow insulating cylinder 27. The main portion of the current limiting device is a fusible element 29 which is made of silver, or any other metal with a high melting point.

A metal cap 30 is provided to fit over the right hand edge of the main insulating casing 27. The caps 28 and 30 are made of a conducting metal and serve as terminals for the current limiting device 22, as may be best seen in Figure 1. The fusible element 29 has four extending ears 31, 32, 33 and 34. These ears are extended to protrude over and around the surface of the main casing 27. When the cap 28 is placed over the hollow cylinder 27, it engages the extremities of the ears 31 and 32, thereby grasping these units between the inner surface of the cap 28 and the outer surface of the cylinder 27. In like manner, the cap 30, when placed in the position shown in Figure 2, will hold the extension ears 33 and 34 between the inner surface of the cap 30 and the outer surface of the main casing 27. Although it has been found practical to construct the fusible element with extension ears, it will be understood that any other means may be provided to hold the element 29 within the casing 27, as set forth in the above mentioned patents.

The fusible element 29 is provided with a series of holes 36' disposed laterally across the unit. Thus, current will flow from the terminal cap 28 through ears 31 and 32, through portion 35 and thence through the reduced cross-sectional area 36 to portion 37 and then through ears 33 and 34 to cap 30.

Accordingly, when a severe fault current occurs, the increased resistance due to the reduce cross-sectional areas 36, located between holes 36', will cause the fusible element 29 to rupture along the lateral line defined by the holes 36'.

The cap 28 has a opening 45 in the center thereof through which a tripping plunger 26 extends. The fusible element 29 has a T extension 38, at the left end thereof. The tripping plunger 26 is rigidly attached to the collar 39 of the fusible element T extension.

A disc 40 with an opening 41 in the center thereof is disposed within the metal cap 28 and is frictionally held therein. As will hereinafter be more apparent, the insulating spacer 40 acts as a barrier for gas which may be blown out of the current limiting device and also serves as a base for the compression spring 42. The compression spring 42 is disposed between this insulating spacer 40 and the collar 39. The collar 39 thus acts as a second base of the compression spring 42 and also acts as a closure for the opening 45 in the metal terminal cap 28 to prevent the expulsion of gases when a short circuit occurs. As will be apparent from the drawing, on the occurrence of a short circuit, the fuse 29 will rupture along the lateral line defined by the holes 36'. When this occurs, the compression spring 42 will be instrumental in driving the collar 39 and tripping plunger 26 forward to thereby engage extension 14 of the common tripper bar 11.

The flat rectangular fusible element 29 is surrounded by powdered quartz filler 43 which is a vitreous material. When the fusible element 29 is ruptured due to the excessive heat of a short circuit current, silver vapors are formed within the casing 27. The formation of this vapor serves to extinguish the arc which will gap the portions 35 and 37 when the fusible element 29 breaks along the lateral line defined by the holes 36.

However, experience has shown that the distance separation of these two portions 35, 37 of the fusible element 29 is not sufficiently large to prevent restriking of the arc, thus, it becomes necessary to supply supplementary means to prevent reforming of an arc between these two portions 35—37 of the fusible element 29. This is accomplished as follows: the heat generated in the fusible element 29 due to the short circuit current, is sufficient to vitrify the powdered quartz filler 43. This melted quartz will then form a glass barrier between the two portions 35—37 of the fusible elements 29. Accordingly, a solid glass insulator is formed by this operation between portions 35—37, hence, it becomes impossible for the arc to restrike.

As above noted, the vapor formed, due to the melting of the silver element 29, is instrumental in extinguishing the arc formed. Hence, it is desirable to build up as much pressure as possible with this vapor.

As noted, when rupture occurs, the collar 39 will be urged to the left by the compression spring 42 to thereby bring the plunger 26 to engagement with the extension 14 and the common tripper bar 11. When this forward motion occurs, the collar 39 not only serves as a forward support for the compression spring 42 but also serves to seal off the opening 45 of the metal cap terminal 28. Hence, by this means, the silver vapor is sealed within the confines of the casing 27 and its associated metal terminals 28 and 30 and thereby builds up sufficient pressure to extinguish the fault current arc.

As heretofore noted, an insulating disc spacer 40 is also provided within the metal cap terminal 28. This spacer also acts as a barrier for the gases which may be blown out of the casing 27 and hence, aids the collar 39 in sealing the vapors within the main casing.

As may be best seen in Figure 3, the thermal element 19, the current limiting device 22 and standard magnetic trip have different inverse time current characteristic curves.

Normal or operating current is designated by the letter A. When the current of this magnitude flows through the circuit, it is obviously insufficient to deflect the bimetallic thermal element 19. However, if an overcurrent occurs so that the magnitude is between the values designated by the letters A and B, the thermal element 19 will be sufficiently deflected to bring its calibration pin 25 into engagement with the extension arm 15 and thereby trip the circuit breaker by means of common tripper bar 11.

During the occurrence of overcurrents of the range between magnitudes of A and B, the fusible element 29 of the current limiting device 22 will also be heated. However, as is apparent from Figure 3, the deflection of the bimetallic element 19 will occur long before the element 29 is ruptured and hence, only the bimetallic element 19 is instrumental in effecting contact separation.

On the occurrence of a severe fault current or short circuit current, the magnitude will be of a value greater than that designated by the letter B. In this range, the heat generated in the reduced cross-sectional areas 36 of the fusible element 29 will be sufficiently heated to melt the fusible element and cause the compression spring 42 to rupture it. Since the time required for the bimetallic element 19 to deflect to circuit breaker trip position will be much greater than the time required for the fusible element 29 to melt, the rupture of the latter unit will occur first. As heretofore noted, this will permit the compression spring 42 to drive the tripping plunger 26 forward and into engagement with the extension arm 14, thereby tripping the circuit breaker open. The striker pin 26 will engage the protrusion 14 of the common tripper bar 12 when current limiting fuse 22 ruptures. Thus the spring means 42 will continue to urge the striker pin 26 forward hence preclude reclosing of the circuit breaker 22 whenever any one of the fuses has ruptured.

As best seen in Figure 3, for values of fault current above C, the response of the current limiting device 22 will be more rapid than for the magnetic trip device.

As shown in Figure 4, when the short circuit current is of the magnitude $i_{sc_1}$ and the fusible element 29 of current limiting device 22 ruptures at current magnitude indicated by the numeral 60, the circuit will be interrupted by the current limiting device 22 at time D. However, if the short circuit current is more severe, i. e., $i_{sc_2}$, and the rate of increase more rapid, as indicated by the curve $i_{sc_2}$, the current limiting device 22 will rupture at time E to thereby interrupt the circuit.

In summary, my invention provides a standard multipole circuit breaker which can be adapted with a current limiting device. By this combination, I can eliminate the shortcomings encountered when using a current limiting device by itself. That is, (1) if a fault occurs in one phase of a multi-phase line, only that phase is open and thus, dangerous single phasing occurs; (2) it is always necessary that disconnect means be placed ahead of the fuse. Therefore, by adapting a standard circuit breaker with a current limiting device, I can (1) simultaneously open all of the phases of the line on the occurrence of an overcurrent or short circuit in any one phase of a line and thereby prevent single phasing; (2) forward movement of the tripper plunger of the current limiting device will cause a contact separation and thereby eliminate the necessity of placing a disconnect means ahead of this fuse element; and (3) permit the contacts to separate under low interrupting capacity duty.

Accordingly, the device of my invention functions as a disconnect means, an overcurrent device and as a current limiting circuit breaker.

It will also be appreciated with my novel apparatus, in addition to the above advantages, the advanced position of the plunger 26 will provide visual means to indicate which of the phases is the source of the fault. That is, the advanced position of the tripper plunger will be an indication to the operator as to the phase where the fault has occurred.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appended claims.

I claim:

1. In a circuit breaker for use in a low voltage electrical system, which system has an available fault current in excess of the interrupting capacity of the circuit breaker, said circuit breaker having a casing therefor and reduced interrupting capacity duty less than the available abnormal current, and having a pair of cooperating contacts, said pair of contacts having a disengaged and a contact engaged position, said circuit breaker having bias means for biasing one of said contacts toward disengaged position and having latching means for normally maintaining said one of said contacts in contact engaged position against the action of said biasing means, an abnormal current responsive element responsive to abnormal currents in said system, a mechanical linkage extending from said abnormal current responsive element to said latching means to operate said latching means when said abnormal current responsive element operates in response to an abnormal current, said linkage thereupon releasing said latching means to permit said biasing means to operate said one of said contacts to disengaged position, said abnormal current responsive element requiring in excess of a certain period of time to operate in response to the abnormal currents, said circuit breaker being in unitary combination with a current limiting fuse, said current limiting fuse being connected in circuit with said pair of contacts, said current limiting fuse having an electrical characteristic such that it interrupts only abnormal currents of values in excess of the interrupting capacity of said circuit breaker and at least up to the available abnormal current of said system and achieves such interruption in a time interval which is less than the time required by the abnormal current responsive means of said circuit breaker to operate said circuit breaker to disengage said contacts in response to such abnormal currents so that abnormal currents in excess of the interrupting capacity of the circuit breaker are interrupted in said system by said current limiting fuse before said abnormal current responsive means can operate said circuit breaker sufficiently to interrupt the circuit.

2. In a circuit breaker for use in a polyphase system, which system has an available abnormal current in excess of the interrupting capacity of the circuit breaker, said circuit breaker having a casing therefor and reduced interrupting capacity duty less than the available abnormal current, and having a pair of cooperating contacts for each phase, one of each pair of contacts having a disengaged and a contact engaged position, said circuit breaker having bias means for biasing one of each of said pair of contacts toward disengaged position and having latching means for normally maintaining said one of each pair of contacts in contact engaged position against the action of said biasing means, an abnormal current responsive element responsive to abnormal currents in said system, a mechanical linkage extending from said abnormal current responsive element to said latching means to operate said latching means when said abnormal responsive element operates in response to an abnormal current, said linkage thereupon releasing said latching means to permit said biasing means to operate said one of each pair of contacts to disengaged position, said abnormal responsive element requiring in excess of a certain period of time to operate in response to the abnormal current; means on said circuit breaker whereby when said abnormal responsive means operates any one of said contacts to disengaged position, all of the contacts of said other phases of said system are simultaneously moved to disengaged position; said circuit breaker being in unitary combination with a current limiting fuse, one of said current limiting fuses being connected in each phase of said polyphase system and in circuit with the associated pair of contacts of the associated phase of said circuit breaker, said current limiting fuse having an electrical characteristic such that it interrupts only abnormal currents of a value in excess of the interrupting capacity of said circuit breaker and at least up to the available abnormal current of said system and achieves such interruption in a time interval which is less than the time required by the abnormal current responsive means of said circuit breaker to operate said circuit breaker to disengage said contacts in response to abnormal currents so that abnormal currents in excess of the interrupting capacity of the circuit breaker are interrupted in said system by said current limiting fuse before said abnormal current responsive means can operate said circuit breaker sufficiently to interrupt the circuit, and a mechanical linkage from said current limiting fuse to said latching means of said circuit breaker and operable in response to the interruption of said system by said current limiting fuse to operate said latching means and thereby permit said biasing means to operate said contacts of all of said phases to disengaged position following the interruption of said circuit by said current limiting fuse.

3. In a circuit breaker for use in a low voltage electrical system, which system has an available abnormal current in excess of the interrupting capacity of the circuit breaker to permit the circuit breaker to open said system with a substantially reduced interrupting capacity duty, said circuit breaker having a casing therefor and reduced interrupting capacity duty less than the available abnormal current, and having a pair of cooperating contacts, said pair of contacts having a disengaged and a contact engaged position, said circuit breaker having bias means for biasing one of said contacts towards disengaged position and having latching means for normally maintaining said one of said contacts in contact engaged position against the action of said biasing means, an abnormal current responsive element responsive to abnormal currents in said system, a connection extending from said abnormal current responsive element to said latching means to operate said latching means when said abnormal current responsive element operates in response to an abnormal current; said connection thereupon releasing said latching means to permit said biasing means to operate said one of said contacts to disengaged position, said abnormal responsive element requiring in excess of a certain period of time to operate in response to the abnormal current; said circuit breaker being in unitary combination with a current limiting fuse; said current limiting fuse being connected in circuit with said pair of contacts, said current limiting fuse having an electrical characteristic such that it interrupts only abnormal currents of values in excess of the interrupting capacity of said circuit breaker and at least up to the available abnormal current of said system and achieves such interruption in a time interval which is less than the time required by the abnormal current responsive means of said circuit breaker to operate said circuit breaker to disengage said contacts in response to such abnormal currents so that abnormal currents in excess of the interrupting capacity of the circuit breaker are interrupted in said system by said current limiting fuse before said abnormal current responsive element can operate said circuit breaker and a connection from said current limiting fuse to said latching means of said circuit breaker and operable in response to the interruption of said system by said current limiting fuse to operate said latching means and thereby permit said biasing means to operate said contacts of all of said phases to disengaged position following the interruption of said circuit by said current limiting fuse.

4. In a circuit breaker for use in a low voltage electrical system, which system has an available abnormal current in excess of the interrupting capacity of the circuit breaker to permit the circuit breaker to open said system with a substantially reduced interrupting capacity duty, said circuit breaker having a casing therefor and reduced interrupting capacity duty less than the available abnormal current, and having a pair of cooperating contacts, said pair of contacts having a disengaged and a contact engaged position, said circuit breaker having bias means for biasing one of said contacts towards disengaged position and having latching means for normally maintaining said one of said contacts in contact engaged position against the action of said bising means, an abnormal current responsive element responsive to abnormal currents in said system, means controlled by said abnormal current responsive element operating in response to an abnormal current to operate said latching means, said latching means when operated permitting said biasing means to operate said one of said contacts to disengaged position, said abnormal current responsive element requiring in excess of a certain period of time to operate in response to the abnormal current; said circuit breaker being in unitary combination with a current limiting fuse, said current limiting fuse being connected in circuit with said pair of contacts, said current limiting fuse having an electrical characteristic such that it interrupts only abnormal currents of values in excess of the interrupting capacity of said circuit breaker and at least up to the available abnormal current of said system and having the further characteristic that it actually interrupts the current at a value sufficiently below an available abnormal current of the system and at a current value which said circuit breaker can safely conduct, the interrupting time of said current limiting fuse being less than the time required by the abnormal current responsive element of said conduit breaker to operate said circuit breaker to disengage said contacts in response to such abnormal currents so that abnormal currents in excess of the interrupting capacity of the circuit breaker are interrupted in said system by said current limiting fuse before said abnormal current responsive element can operate said circuit breaker and a mechanical linkage from said current limiting fuse to said latching means of said circuit breaker and operable in response to the interruption of said system by said current limiting fuse to operate said latching means and thereby permit said biasing means to operate said contacts of all said phases to disengaged position following the interruption of said circuit by said current limiting fuse.

5. In a circuit breaker for use in a low voltage electrical system, which system has an available abnormal current in excess of the interrupting capacity of the circuit breaker to permit the circuit breaker to open said system with a substantially reduced interrupting capacity duty, said circuit breaker having a casing therefor and reduced interrupting capacity duty less than the available abnormal current, and having a pair of cooperating contacts, said pair of contacts having a disengaged and a contact engaged position, said circuit breaker having bias means for biasing one of said contacts towards disengaged position and having latching means for normally maintaining said one of said contacts in contact engaged position against the action of said biasing means, an abnormal current responsive element comprising bi-metallic elements responsive to abnormal currents in said system, a mechanical linkage extending from said abnormal current responsive element to said latching means to operate said latching means when said abnormal current responsive element operates in response to an abnormal current, said linkage thereupon releasing said latching means to permit said biasing means to operate said one of said contacts to disengaged position, said abnormal current responsive element requiring in excess of a certain period of time to operate in response to the abnormal current, said circuit breaker being in unitary combination with a current limiting fuse, said current limiting fuse being connected in circuit with said pair of contacts, said current limiting fuse having an electrical characteristic such that it interrupts only abnormal currents of values in excess of the interrupting capacity of said circuit breaker and at least up to the available abnormal current of said system and achieves such interruption in a time interval which is less than the time required by the abnormal current responsive element of said circuit breaker to operate said circuit breaker to disengage said contacts in response to such abnormal currents so that abnormal currents in excess of the interrupting capacity of the circuit breaker are interrupted in said system by said current limiting fuse before said abnormal current responsive means can operate said circuit breaker and a mechanical linkage from said current limiting fuse to said latching means of said circuit breaker and operable in response to the interruption of said system by said current limiting fuse to operate said latching means and thereby permit said biasing means to operate said contacts of all phases to disengaged position following the interruption of said circuit by said current limiting fuse.

6. In a circuit breaker for use in a low voltage electrical system, which system has an available abnormal current in excess of the interrupting capacity of the circuit breaker, said circuit breaker having a casing therefor and reduced interrupting capacity duty less than the available abnormal current, and having a pair of cooperating contacts, said pair of contacts having a disengaged and a contact engaged position, said circuit breaker having bias means for biasing one of said contacts toward disengaged position and having latching means for normally maintaining said one of said contacts in contact engaged position against the action of said biasing means, an abnormal current responsive element responsive to abnormal currents in said system, a mechanical linkage extending from said abnormal current responsive element to said latching means to operate said latching means when said abnormal current responsive element operates in response to an abnormal current, said linkage thereupon releasing said latching means to permit said biasing means to operate said one of said contacts to disengaged position, said abnormal current responsive element requiring predetermined periods of time to operate in response to the abnormal currents, said circuit breaker being in unitary combination with a current limiting fuse, said current limiting fuse being connected in circuit with said pair of contacts, said current limiting fuse having an electrical characteristic such that it interrupts abnormal currents of values in excess of a predetermined value and at least up to the available abnormal currents of said system and achieves such interruption in a time interval which is less than the time required by the abnormal current responsive means of said circuit breaker to operate said circuit breaker to disengage said contacts in response to such abnormal currents so that abnormal currents in excess of said predetermined value are interrupted in said system by said current limiting fuse before said abnormal current responsive means can operate said circuit breaker sufficiently to interrupt the circuit.

7. In a circuit breaker for use in a polyphase system, which system has an available abnormal current in excess of the interrupting capacity of the circuit breaker, said circuit breaker having a casing therefor and reduced interrupting capacity duty less than the available abnormal current, and having a pair of cooperating contacts for each phase, one of each pair of contacts having a disengaged and a contact engaged position, said circuit breaker having bias means for biasing one of each of said pair of contacts toward disengaged position and having latching means for normally maintaining said one of each pair of contacts in contact engaged position against the action of said biasing means, an abnormal current responsive element responsive to abnormal currents in said system of at least a predetermined minimum amplitude; a mechanical linkage extending from said abnormal current responsive element to said latching means to operate said latching means when said abnormal responsive element operates in response to abnormal currents, said linkage thereupon releasing said latching means to permit said biasing means to operate said one of each pair of contacts to disengaged position, said abnormal responsive element requiring predetermined periods of time to operate in response to abnormal currents; means on said circuit breaker whereby when said abnormal responsive means operates any one of said contacts to disengaged position, all of the contacts of said other phases of said system are simultaneously moved to disengaged position; said circuit breaker being in unitary combination with a current limiting fuse, one of said current limiting fuses being connected in each phase of said polyphase system and in circuit with the associated pair of contacts of the associated phase of said circuit breaker, said current limiting fuse having an electrical characteristic such that it interrupts only abnormal currents of a value in excess of said predetermined minimum amplitude and at least up to the available abnormal current of said system and achieves such interruption in a time interval which is less than the time required by the abnormal current responsive means of said circuit breaker to operate said circuit breaker to disengage said contacts in response to said last mentioned abnormal currents so that said last mentioned currents are interrupted in said system by said current limiting fuse before said abnormal current responsive means can operate said circuit breaker sufficiently to interrupt the circuit, and a mechanical linkage from said current limiting fuse to said latching means of said circuit breaker and operable in response to the interruption of said system by said current limiting fuse to operate said latching means and thereby permit said biasing means to operate said contacts of all of said phases to disengaged position following the interruption of said circuit by said current limiting fuse.

8. In a circuit breaker for use in a low voltage electrical system, which system has an available abnormal current in excess of the interrupting capacity of the circuit breaker, said circuit breaker having a casing therefor and reduced interrupting capacity duty less than the available abnormal current, and having a pair of cooperating contacts, said pair of contacts having a disengaged and a contact engaged position, said circuit breaker having bias means for biasing one of said contacts toward disengaged position and having latching means for normally maintaining said one of said contacts in contact engaged position against the action of said biasing means, an abnormal current responsive element responsive to abnormal currents in said system, a mechanical linkage extending from said abnormal current responsive element to said latching means to operate said latching means when said abnormal current responsive element operates in response to an abnormal current, said linkage thereupon releasing said latching means to permit said biasing means to operate said one of said contacts to disengaged position, said abnormal current responsive element requiring predetermined periods of time to operate in response to the abnormal currents, said circuit breaker being in unitary combination with a current limiting fuse, said current limiting fuse being connected in circuit with said pair of contacts, said current limiting fuse having an electrical characteristic such that it interrupts abnormal currents of values in excess of a predetermined value and at least up to the available abnormal currents of said system and achieves such interruption in a time interval which is less than the time required by the abnormal current responsive means of said circuit breaker to operate said circuit breaker to disengage said contacts in response to such abnormal currents so that abnormal currents in excess of said predetermined value are interrupted in said system by said current limiting fuse before said abnormal current responsive means can operate said circuit breaker sufficiently to interrupt the circuit and a mechanical linkage from said current limiting fuse to said latching means of said circuit breaker and operable in response to the interruption of said system by said current limiting fuse to operate said latching means and thereby permit said biasing means to operate said contacts to disengaged position following the interruption of said circuit by said current limiting fuse.

9. In a circuit breaker for use in a low voltage electrical system, which system has an available abnormal current in excess of the interrupting capacity of the circuit breaker, said circuit breaker having a casing therefor and reduced interrupting capacity duty less than the available abnormal current, and having a pair of cooperating contacts, said pair of contacts having a disengaged and a contact engaged position, said circuit breaker having bias means for biasing one of said contacts toward disengaged position and having latching means for normally maintaining said one of said contacts in contact engaged position against the action of said biasing means, an abnormal current responsive element responsive to abnormal currents in said system, a mechanical linkage extending from said abnormal current responsive element to said latching means to operate said latching means when said abnormal current responsive element operates in response to an abnormal current, said linkage thereupon releasing said latching means to permit said biasing means to operate said one of said contacts to disengaged position, said abnormal current responsive element requiring predetermined periods of time to operate in response to the abnormal currents, said circuit breaker being in unitary combination with a current limiting fuse, said current limiting fuse being connected in circuit with said pair of contacts, said current limiting fuse having an electrical current-time characteristic curve such that a cross-over occurs between the electrical characteristic curve of the circuit breaker and current limiting fuse at a predetermined abnormal current value so that for all values of current above said predetermined value the current limiting fuse opens the system before the circuit breaker can open the system by its abnormal current responsive element and for all values of abnormal current below said predetermined value the circuit breaker opens the system before said current limiting fuse can act to open said circuit and a mechanical linkage from said current limiting fuse to said latching means of said circuit breaker and operable in response to the interruption of said system by said current limiting fuse to operate said latching means and thereby permit said biasing means to operate said contacts to disengaged position following the interruption of said system by said current limiting fuse.

10. In combination a substantially rectangular frame structure of insulating material; an automatic circuit interrupter comprising normally closed separable contact means spring biased to the open position thereof and current carrying overload responsive tripping means mounted on said frame structure; a current-limiting back-up fuse for said interrupter also mounted on said frame structure; a striker pin device forming an integral part of said fuse to trip said interrupter upon blowing of said fuse: a pair of electrical connectors arranged on and supported by said frame structure each adjacent to one of two parallel sides thereof for connecting said interrupter into an electric circuit; a first conductor means for conductively connecting one of said separable contact means to one of said pair of connectors; a second conductor means for conductively connecting another of said separable contact means to the other of said pair of connectors, and said second conductor means including said current carrying tripping means and said fuse.

11. In combination a substantially rectangular frame structure of insulating material; an automatic circuit interrupter mounted on said frame structure, said interrupter including normally closed separable contact means, spring-bias means tending to move said contact means to the open position thereof, a latch mechanism normally restraining said contact means in the closed position thereof, overload responsive tripping means adapted to carry current cooperating with said latch mechanism to permit separation of said contact means under the action of said spring-bias means, and a manual operator for operating said contact means with said latch mechanism in latched position; a current-limiting fuse adapted to blow only upon occurrence of major fault currents backing-up said interrupter mounted on said frame structure, said fuse including striker pin means arranged with the longitudinal axis thereof parallel to a pair of cooperating latching surfaces of said latch mechanism to trip said interrupter upon blowing of said fuse irrespective of the condition said tripping means is in; a pair of electrical connectors arranged on and supported by said frame structure each adjacent to one of two parallel sides thereof for connecting said interrupter into an electric circuit; a first conductor means for conductively connecting one of said separable contact means to one of said pair of connectors; a second conductor means for conductively connecting another of said separable contact means to the other of said pair of connectors, said second conductor means including said overload responsive tripping means and said fuse; and said overload responsive tripping means and said fuse being arranged on said frame structure within a space bounded on one side by said separable contact means and on the other side by said other of said pair of connectors.

12. In combination a multipolar automatic circuit interrupter having a common tripping mechanism for all the poles thereof to effect simultaneous interruption of all the phases of a multiphase circuit into which said interrupter is inserted, a plurality of current-limiting back-up fuses for said interrupter each associated with one pole thereof, a common frame structure of insulating material supporting said interrupter and said plurality of fuses, a plurality of pairs of cooperating disconnect contacts associated with said frame structure adapted for joint insertion of said interrupter and said plurality of fuses into and joint disconnection of said interrupter and of said plurality of fuses from an electric multiphase circuit, a plurality of striker pin devices each associated with one of said plurality of fuses and each responsive to blowing of one of said plurality of fuses to operate said common tripping mechanism of said interrupter, and spring means associated with each of said plurality of striker pin devices adapted to preclude reclosing of said interrupter upon operation of any of said plurality of striker pin devices.

References Cited in the file of this patent

UNITED STATES PATENTS

| | | |
|---|---|---|
| 1,192,974 | Anderson | Aug. 1, 1916 |
| 1,738,867 | Call | Dec. 10, 1929 |
| 1,955,327 | Dorfman | Apr. 17, 1934 |
| 2,050,285 | Dorfman | Aug. 11, 1936 |
| 2,094,473 | Schmitt | Sept. 28, 1937 |
| 2,096,544 | Jackson | Oct. 19, 1937 |
| 2,144,501 | Lingal | Jan. 17, 1939 |
| 2,279,737 | Jennings | Apr. 14, 1942 |
| 2,285,252 | Conrad | June 2, 1942 |
| 2,330,690 | Dannenberg | Sept. 28, 1943 |
| 2,338,946 | Kesselring | Jan. 11, 1944 |
| 2,405,929 | Wald | Aug. 13, 1946 |
| 2,445,426 | Gamel et al. | July 20, 1948 |
| 2,458,151 | Dorfman et al. | Jan. 4, 1949 |
| 2,473,196 | Dannenberg | June 14, 1949 |
| 2,594,315 | Kozacka | Apr. 29, 1952 |